(12) United States Patent
Yanase et al.

(10) Patent No.: US 9,079,292 B2
(45) Date of Patent: Jul. 14, 2015

(54) METHOD OF MAKING BARREL-SHAPED WORM-LIKE TOOL

(75) Inventors: Yoshikoto Yanase, Tokyo (JP); Masashi Ochi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 468 days.

(21) Appl. No.: 13/500,838

(22) PCT Filed: Oct. 6, 2010

(86) PCT No.: PCT/JP2010/067503
§ 371 (c)(1),
(2), (4) Date: Jun. 18, 2012

(87) PCT Pub. No.: WO2011/043358
PCT Pub. Date: Apr. 14, 2011

(65) Prior Publication Data
US 2012/0252317 A1    Oct. 4, 2012

(30) Foreign Application Priority Data
Oct. 9, 2009   (JP) ................. 2009-234953

(51) Int. Cl.
*B24B 49/18* (2006.01)
*B24B 53/07* (2006.01)
(Continued)

(52) U.S. Cl.
CPC .............. *B24B 53/075* (2013.01); *B23F 5/04* (2013.01); *B23F 13/006* (2013.01); *B23F 21/026* (2013.01); *B23F 23/1225* (2013.01); *B24B 49/18* (2013.01); *B24B 53/07* (2013.01)

(58) Field of Classification Search
USPC .......................... 451/5, 11, 56, 443

IPC ................... B24B 49/00,49/18, 53/00, 53/005, B24B 53/07, 53/075, 53/085
See application file for complete search history.

(56) References Cited

U.S. PATENT DOCUMENTS 5,209,020 A     5/1993  Feisel
6,951,501 B2 *  10/2005 Tan ................................. 451/5
(Continued)

FOREIGN PATENT DOCUMENTS

DE        42 07 511 A1    9/1993
EP        2177316 A1      4/2010
(Continued)

OTHER PUBLICATIONS

Taiwanese Office Action dated Dec. 5, 2013 for related Application No. 099134405 with an English translation.
(Continued)

*Primary Examiner* — Eileen Morgan
(74) *Attorney, Agent, or Firm* — Birch, Stewart, Kolasch & Birch, LLP

(57) ABSTRACT

Provided is a method of making a barrel-shaped worm-like tool whereby a barrel-shaped worm-like tool capable of efficiently performing grinding without unequal wear can easily be made. The aforementioned method comprises making the barrel-shaped worm-like tool (12) by using a dressing gear (11) to dress the barrel-shaped worm-like tool (12), which is used for machining an internal gear and has a diameter that gradually increases from the ends (12b, 12c) to the center (12a) in the axial direction. On the basis of data wherein the number of teeth is less than that of the internal gear to be machined, the dressing gear (11) and the barrel-shaped worm-like tool (12) are engaged with each other at the same axial intersection angle as during gear-machining performed by the barrel-shaped worm-like tool (12).

1 Claim, 10 Drawing Sheets

(51) Int. Cl.
  B23F 23/12   (2006.01)
  B24B 53/075  (2006.01)
  B23F 5/04    (2006.01)
  B23F 13/00   (2006.01)
  B23F 21/02   (2006.01)

(56) References Cited

U.S. PATENT DOCUMENTS

| | | | |
|---|---|---|---|
| 8,460,064 B2* | 6/2013 | Yanase et al. | 451/56 |
| 2003/0207650 A1* | 11/2003 | Tan | 451/5 |
| 2005/0239385 A1 | 10/2005 | Jankowski et al. | |
| 2010/0272534 A1* | 10/2010 | Yanase et al. | 409/1 |
| 2011/0275290 A1 | 11/2011 | Ochi et al. | |
| 2012/0252317 A1* | 10/2012 | Yanase et al. | 451/5 |

FOREIGN PATENT DOCUMENTS

| | | |
|---|---|---|
| JP | 7-32214 A | 2/1995 |
| JP | 2006-68866 A | 3/2006 |
| JP | 2009-45681 A | 3/2009 |
| JP | 2009-142939 A | 7/2009 |
| TW | 200924906 A | 6/2009 |
| WO | WO 2008/156078 A1 | 12/2008 |
| WO | WO 2009/025198 A1 | 2/2009 |

OTHER PUBLICATIONS

US Office Action dated Mar. 27, 2015 for related U.S. Appl. No. 14/631,559.

* cited by examiner

| Number of teeth of dressing gear | 1 | 2 | 3 | 4 | 5 | 6 | 7 | 8 | 9 |
|---|---|---|---|---|---|---|---|---|---|
| Number of teeth of dressing gear | 50 | 52 | 54 | 56 | 58 | 60 | 62 | 64 | 66 |
| Tooth bottom diameter (mm) of dressing gear | 110.4 | 114.7 | 118.9 | 123.2 | 127.4 | 131.7 | 136.0 | 140.2 | 144.5 |
| Tooth top diameter (mm) of dressing gear | 102.4 | 106.7 | 110.9 | 115.2 | 119.4 | 123.7 | 128.0 | 132.2 | 136.5 |
| Grindstone helix angle (deg) (center) | 50 | 50 | 50 | 50 | 50 | 50 | 50 | 50 | 50 |
| Axis angle (deg) | 30 | 30 | 30 | 30 | 30 | 30 | 30 | 30 | 30 |
| Grindstone pitch circle diameter (center) (mm) | 71.56 | 71.56 | 71.56 | 71.56 | 71.56 | 71.56 | 71.56 | 71.56 | 71.56 |
| Grindstone pitch circle diameter (end) (mm) | 69.44 | 69.60 | 69.73 | 69.85 | 69.96 | 70.05 | 70.13 | 70.20 | 70.29 |
| Amount of change Δr (mm) in grindstone pitch circle radius | 1.06 | 0.98 | 0.91 | 0.86 | 0.80 | 0.76 | 0.72 | 0.68 | 0.65 |

| Number of teeth of dressing gear | 1 | 2 | 3 | 4 | 5 | 6 | 7 | 8 | 9 |
|---|---|---|---|---|---|---|---|---|---|
| Number of teeth of dressing gear | 80 | 82 | 84 | 86 | 88 | 90 | 92 | 94 | 96 |
| Tooth bottom diameter (mm) of dressing gear | 104.6 | 107.1 | 109.7 | 112.2 | 114.8 | 117.3 | 119.9 | 122.4 | 125.0 |
| Tooth top diameter (mm) of dressing gear | 99.8 | 102.3 | 104.9 | 107.4 | 110.0 | 112.5 | 115.1 | 117.6 | 120.2 |
| Grindstone helix angle (deg) (center) | 50 | 50 | 50 | 50 | 50 | 50 | 50 | 50 | 50 |
| Axis angle(deg) | 30 | 30 | 30 | 30 | 30 | 30 | 30 | 30 | 30 |
| Grindstone pitch circle diameter (center) (mm) | 57.87 | 57.87 | 57.87 | 57.87 | 57.87 | 57.87 | 57.87 | 57.87 | 57.87 |
| Grindstone pitch circle diameter (end) (mm) | 55.97 | 56.05 | 56.12 | 56.19 | 56.25 | 56.31 | 56.36 | 56.41 | 56.46 |
| Amount of change $\Delta r$ (mm) in grindstone pitch circle radius | 0.95 | 0.91 | 0.88 | 0.84 | 0.81 | 0.78 | 0.76 | 0.73 | 0.71 |

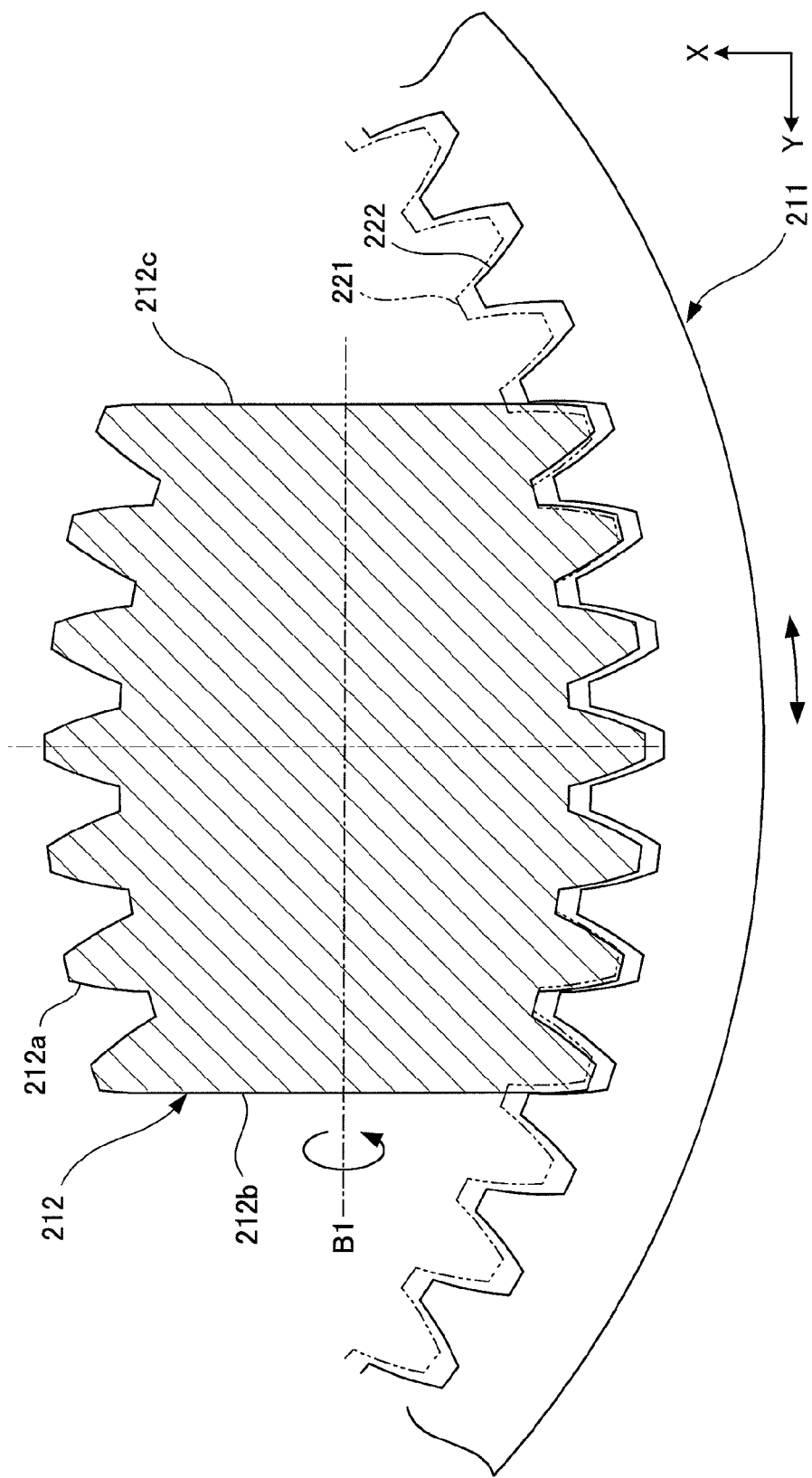

METHOD OF MAKING BARREL-SHAPED WORM-LIKE TOOL

TECHNICAL FIELD

This invention relates to a method for forming or dressing a barrel-shaped worm-like grindstone assuming the shape of a barrel, the barrel-shaped worm-like grindstone being used for grinding the tooth flanks of an internal gear.

BACKGROUND ART

Gears are in frequent use in transmissions for automobiles and so on. In recent years, an improvement in the machining accuracy of the gears has been desired with the aim of reducing vibrations and noise of the transmissions. With the gear machining method, it is common practice to carry out gear cutting in a predetermined gear material, thereby forming a tooth profile, heat-treat the gear formed by gear cutting, and then perform finishing (grinding) in order to remove strain or the like due to this heat treatment. So far, the external gear to be machined after heat treatment and a grindstone have been put in mesh, with an angle of axis intersection being given, and the tooth flanks of the external gear to be machined have been ground. Tools used for these grinding processes include tools available in various shapes, such as an external gear shape, an internal gear shape, and a screw (worm) shape, in accordance with the shape of the gear to be ground.

As grinding proceeds, the grindstone undergoes loading or wear, and its sharpness decreases. After the grindstone has ground a predetermined number of gears, therefore, it becomes necessary to perform dressing or truing on the grindstone having a worn-out grinding surface, thereby regenerating a sharp cutting edge surface.

As a method for carrying out dressing or truing, it is performed to dress the grindstone with the use of a dressing gear set to have nearly the same gear specifications as those of the finished gear. Patent Document 1 relates to a hard gear honing process using an internally toothed grindstone on a gear after heat treatment, and discloses a dressing gear whose number of teeth is set to be equal to or more than 1.5 times the number of teeth of the gear to be machined (work) in order to perform high accuracy dressing or truing of the internally toothed grindstone.

PRIOR ART DOCUMENTS

Patent Documents

Patent Document 1: JP-A-7-32214 (see, for example, paragraphs [0006] to [0008] in the specification)

SUMMARY OF THE INVENTION

Problems to be Solved by the Invention

In recent years, a further increase in the machining accuracy of an internal gear as well as an external gear has been desired. As a grindstone for use in grinding an internal gear to be machined, there is a barrel-shaped worm-like grindstone formed in the shape of a barrel such That the diametrical dimension of the grindstone gradually decreases from an intermediate portion in the direction of the rotation axis of the grindstone toward the opposite ends in the axial direction of the grindstone. A dressing gear for dressing or truing this barrel-shaped worm-like grindstone is generally designed and manufactured to have the same specifications as those of an internal gear to be machined after finishing, in order to provide the barrel-shaped worm-like grindstone with a shape suitable for the shape of the internal gear to be machined after finishing.

However, a machining allowance region for grinding has been set in the internal gear to be machined after heat treatment. Thus, in finishing the internal gear to be machined with the use of the barrel-shaped worm-like grindstone dressed or trued by the dressing gear produced with the same specifications as those of the internal gear, there may be a case where the tooth profile of the barrel-shaped worm-like grindstone cannot properly engage the tooth profile of the internal gear to be machined. Concretely, a stock allowance tooth profile (machining allowance) 221 for a tooth profile 222 is formed in an internal gear 211 to be machined, as shown in FIGS. 9 and 10. When grinding is initiated, a barrel-shaped worm-like grindstone 212 and the internal gear 211 to be machined are brought into engagement appropriately in terms of position. Generally, engagement takes place, with the central position of the barrel-shaped worm-like grindstone 212 as a reference. At the initial stage of machining, therefore, a cutting edge 212*a* of the barrel-shaped worm-like grindstone 212 contacts only the stock allowance tooth profile 221 of the internal gear 211 to be machined, at the axially opposite ends 212*b* and 212*c* of the barrel-shaped worm-like grindstone 212, with the result that engagement at this site is greater than required as compared with engagement at the axial center of the barrel-shaped worm-like grindstone 212. If grinding is performed in such a state of engagement, local load is imposed on the opposite ends 212*b* and 212*c* of the barrel-shaped worm-like grindstone 212, at the initial stage of grinding. As a result, irregular grinding load or unequal wear may occur.

The present invention has been proposed, therefore, in light of the above-described problems. It is an object of the invention to provide a method of making a barrel-shaped worm-like tool whereby a barrel-shaped worm-like tool capable of efficiently performing grinding without unequal wear can easily be made.

Means for Solving the Problems

A method of making a barrel-shaped worm-like tool according to the present invention, for solving the above-mentioned problems, is a method of making a barrel-shaped worm-like tool by using a dressing tool to dress the barrel-shaped worm-like tool which is used for gear-machining an internal gear to be machined and which has a diameter gradually increasing from the ends in an axial direction to the center in the axial direction of the barrel-shaped worm-like tool, wherein on the basis of data in which the number of teeth is less than that of the internal gear to be machined, the dressing tool and the barrel-shaped worm-like tool are engaged with each other at the same axis intersection angle as during gear-machining performed by the barrel-shaped worm-like tool, and the barrel-shaped worm-like tool is dressed.

A method of making a barrel-shaped worm-like tool according to the present invention, for solving the aforementioned problems, is the above-mentioned method of making a barrel-shaped worm-like tool, wherein an internally toothed dressing gear having a smaller number of teeth than the number of the teeth of the internal gear to be machined is used as the dressing tool.

A method of making a barrel-shaped worm-like tool according to the present invention, for solving the aforementioned problems, is the above-mentioned method of making a barrel-shaped worm-like tool, wherein a disk dresser of a shape having, as its contours, the sectional shape of a tooth of the internal gear to be machined is used as the dressing tool, dressing operation data are computed, with the number of the teeth in specification data on the internal gear to be machined being decreased, the disk dresser and the barrel-shaped worm-like tool are engaged with each other, and the barrel-shaped worm-like tool and the disk dresser are moved, in the state of engagement with each other, based on the dressing operation data.

EFFECTS OF THE INVENTION

According to the method of making a barrel-shaped worm-like tool concerned with the present invention, there can easily be prepared a barrel-shaped worm-like grindstone whose grindstone pitch circle diameter at the opposite ends in the axial direction is smaller, and whose radius of curvature at the site is smaller, than in a conventional barrel-shaped worm-like grindstone. Even when an internal gear to be machined, which has strain due to heat treatment or has a large machining allowance, is finished by such a barrel-shaped worm-like grindstone, gear machining can be performed with high accuracy, with decreases in machining load and unequal wear being attained.

BRIEF DESCRIPTION OF THE DRAWINGS

[FIG. 10] is an enlarged view of essential parts in FIG. 9.

MODE FOR CARRYING OUT THE INVENTION

Each embodiment of a method of making a barrel-shaped worm-like tool according to the present invention will be described in detail.

[First Embodiment]

Figure 2:
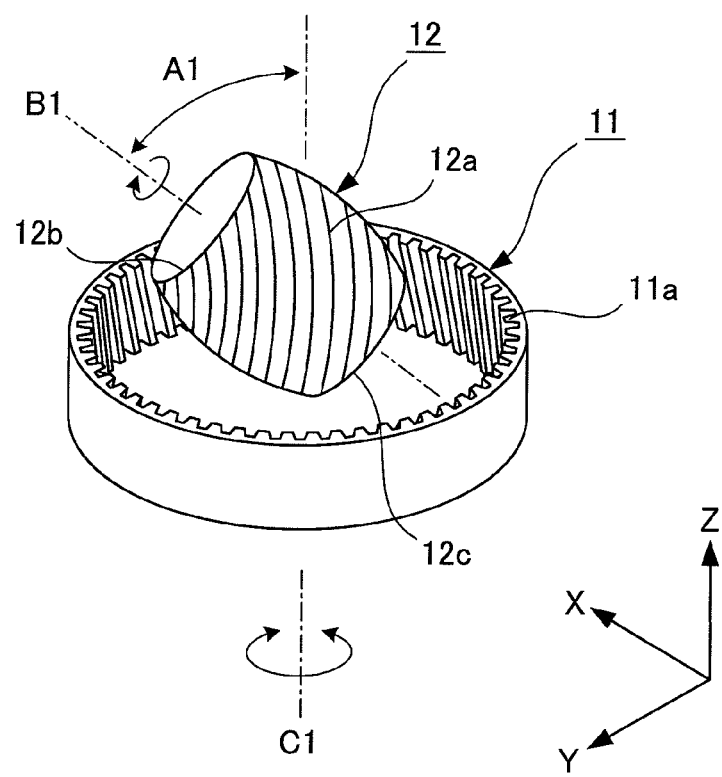
[FIG. 2] is a view showing a support structure for a grindstone and a dressing gear in a dressing apparatus in which a method of making a barrel-shaped worm-like tool is applied as an embodiment of the present invention.
Figure 3:
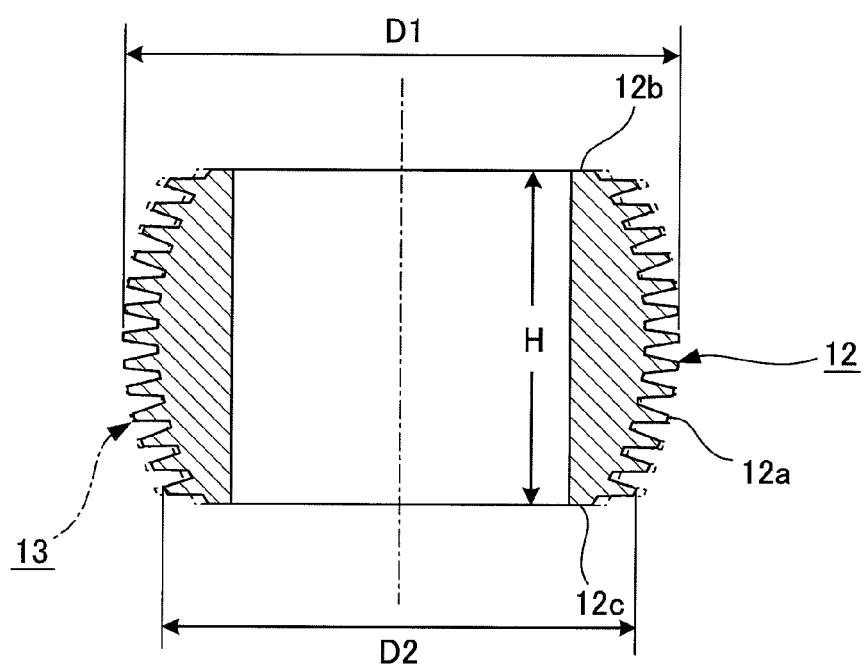
[FIG. 3] is a longitudinal sectional view of a barrel-shaped worm-like grindstone.

A method of making a barrel-shaped worm-like tool according to a first embodiment will be described by reference to FIGS. 1 to 3. In the present embodiment, an explanation will be offered for a case where the method is applied to a dressing apparatus equipped with a dressing gear (dressing tool).

Figure 1:
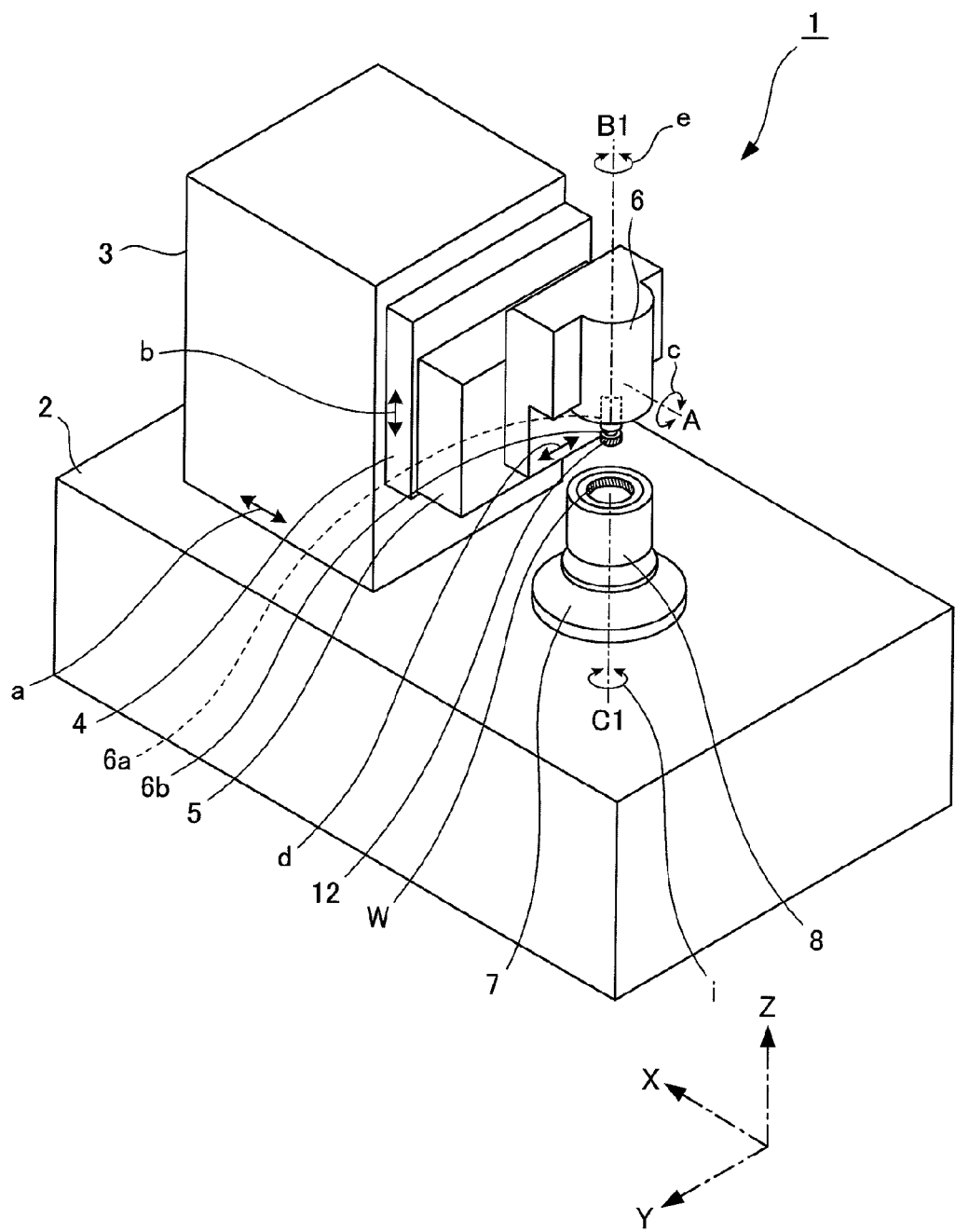
[FIG. 1] is a schematic view of an internal gear grinding machine.

As shown in FIG. 1, an internal gear grinding machine 1 is equipped with a bed 2, a column 3, a saddle 4, a swivel head 5, and a grindstone head 6. The column 3 is supported on the bed 2 so as to be movable in a horizontal X-axis direction. The X-axis direction is a direction in which the column 3 is moved such that the distance between a grindstone rotation axis B1 and a work rotation axis C1 is adjusted. The X-axis direction extends along the fore-and-aft direction of the internal gear grinding machine 1. The saddle 4 is mounted on the column 3, and is supported to be ascendable and descendable in a vertical Z-axis direction orthogonal to the X-axis direction. The swivel head 5 is mounted on the saddle 4, and is supported to be turnable about a grindstone swivel axis A which is horizontal and parallel to the X axis. The grindstone head 6 is mounted on the swivel head 5, and is supported to be movable in a Y-axis direction orthogonal to the grindstone rotation axis B1. A grindstone main spindle (not shown) and a grindstone arbor 6a mounted on the grindstone main spindle are supported by the grindstone head 6 so as to be rotatable about the grindstone rotation axis (tool rotation axis) B1. A barrel-shaped worm-like grindstone 12 is detachably mounted on the leading end of the grindstone arbor 6a.

With the internal gear grinding machine 1 of the above-mentioned axis configuration, when the column 3 is moved, the barrel-shaped worm-like grindstone 12 is moved in the X-axis direction, as indicated by a double-headed arrow a, together with the column 3, the saddle 4, the swivel head 5, and the grindstone head 6 (grindstone arbor 6a). By moving the saddle 4, moreover, the barrel-shaped worm-like grindstone 12 is moved in the Z-axis direction (up-and-down direction of the internal gear grinding machine 1), as indicated by a double-headed arrow b, together with the saddle 4, the swivel head 5, and the grindstone head 6 (grindstone arbor 6a). By turning the swivel head 5, the barrel-shaped worm-like grindstone 12 swivels about the grindstone swivel axis A, as indicated by a circular double-headed arrow c, together with the swivel head 5. At this time, the barrel-shaped worm-like grindstone 12 swivels about the grindstone swivel axis A in the Y-axis direction (moving direction of the grindstone head 6) as well, together with the swivel head 5. Moving the grindstone head 6, the barrel-shaped worm-like grindstone 12 moves in the Y-axis direction, as indicated by a double-headed arrow d, together with the grindstone head 6 (grindstone arbor 6a). By driving the grindstone main spindle within the grindstone head 6, the barrel-shaped worm-like grindstone 12 rotates about the grindstone rotation axis B1, as indicated by a circular double-headed arrow e, together with the grindstone arbor 6a.

In front of the column 3 on the bed 2, a rotating table 7 is provided to be rotatable about the vertical work rotation axis C1. A cylindrical mounting jig 8 is provided on the upper surface of the rotating table 7, and an internal gear W to be machined (i.e. work) is detachably mounted on the upper end inner peripheral surface of the mounting jig 8. Thus, when the rotating table 7 is driven, the internal gear W to be machined rotates about the work rotation axis C1, as indicated by a circular double-headed arrow i, together with the rotating table 7.

When the barrel-shaped worm-like grindstone 12 is to be dressed by a dressing gear 11, the dressing gear 11 is mounted on the mounting jig 8, and the barrel-shaped worm-like grindstone 12 and the dressing gear 11 are engaged with each other. In this state of engagement, the dressing gear 11 is rotated about the dressing gear rotation axis (work rotation axis) C1, and the barrel-shaped worm-like grindstone 12 is synchronously rotated around the grindstone rotation axis B1. During this process, the barrel-shaped worm-like grindstone 12 is swung in the up-and-down direction (Z-axis direction), whereby the cutting edge surface 12a of the barrel-shaped worm-like grindstone 12 is dressed by the cutting edge surface 11a of the dressing gear 11.

The above-mentioned dressing gear 11 is based on data on the number of teeth which is less than the number of teeth of the internal gear W to be machined. The dressing gear 11 is formed to have a smaller number of teeth than the number of teeth of an internal gear to be machined, which is ground by the barrel-shaped worm-like grindstone 12. Thus, the dressing gear 11 has a smaller pitch circle diameter than that of a dressing gear formed to have the same number of teeth as that of an ordinary internal gear to be machined. Based on this data, operating data are computed in a dressing operation computing unit to control operation during dressing. Thus, when the dressing/truing of the barrel-shaped worm-like grindstone 12 is performed using the dressing gear 11 having the smaller pitch circle diameter than that of the dressing gear formed to have the same number of teeth as that of the ordinary internal gear to be machined, the barrel-shaped worm-like grindstone 12 is formed in the shape of a barrel whose diametrical dimension becomes further gradually smaller than a dimension suitable for the shape of the internal gear to be machined after finishing, from the middle (center) in the axial direction toward the opposite ends 12b, 12c in the axial direction along the direction of the grindstone width (the length in the axial direction of the grindstone) H, as shown in FIG. 3.

As a result, when the heat-treated internal gear to be machined is finished using the barrel-shaped worm-like grindstone 12, the cutting edge at the end in the axial direction of the barrel-shaped worm-like grindstone 12 can be prevented from cutting, to a greater degree than required, into the tooth space of the internal gear to be machined. Consequently, reductions in the machining load and unequal wear can be achieved. Furthermore, the entire barrel-shaped worm-like grindstone 12 can uniformly contact the tooth flanks of the internal gear to be machined, and can thereby carry out gear machining with high accuracy.

The lower limit value of the number of teeth of the dressing gear 11 is set, with grinding properties (grinding time) being considered from the machining allowance of the internal gear to be machined, or the contact width (length) between the barrel-shaped worm-like grindstone 12 and the internal gear to be machined when the internal gear to be machined is ground by the barrel-shaped worm-like grindstone 12.

Next, a method for setting the number of teeth of a dressing gear based on the number of teeth of an internal gear to be machined, the method aiming to produce a barrel-shaped worm-like grindstone which can carry out gear machining highly accurately, while achieving decreases in machining load and unequal wear, even if the internal gear to be machined is strained by heat treatment or has a great machining allowance, will be described concretely using FIGS. 7(a), 7(b) and 8(a), 8(b).

To elucidate the relation between the number of teeth of an externally toothed dressing gear and the amount of change in the grindstone pitch circle radius of a barrel-shaped worm-like grindstone, analyses were made in simulations (1) and (2) to be described below. The amount of change in the grindstone pitch circle radius of the barrel-shaped worm-like grindstone is the value of the difference between the pitch circle radius at the center in the axial direction of the barrel-shaped worm-like grindstone and the pitch circle radius at the end in the axial direction of the barrel-shaped worm-like grindstone.

First of all, the simulation (1), will be described using FIGS. 7(a), 7(b).

Figures 7A, 7B:
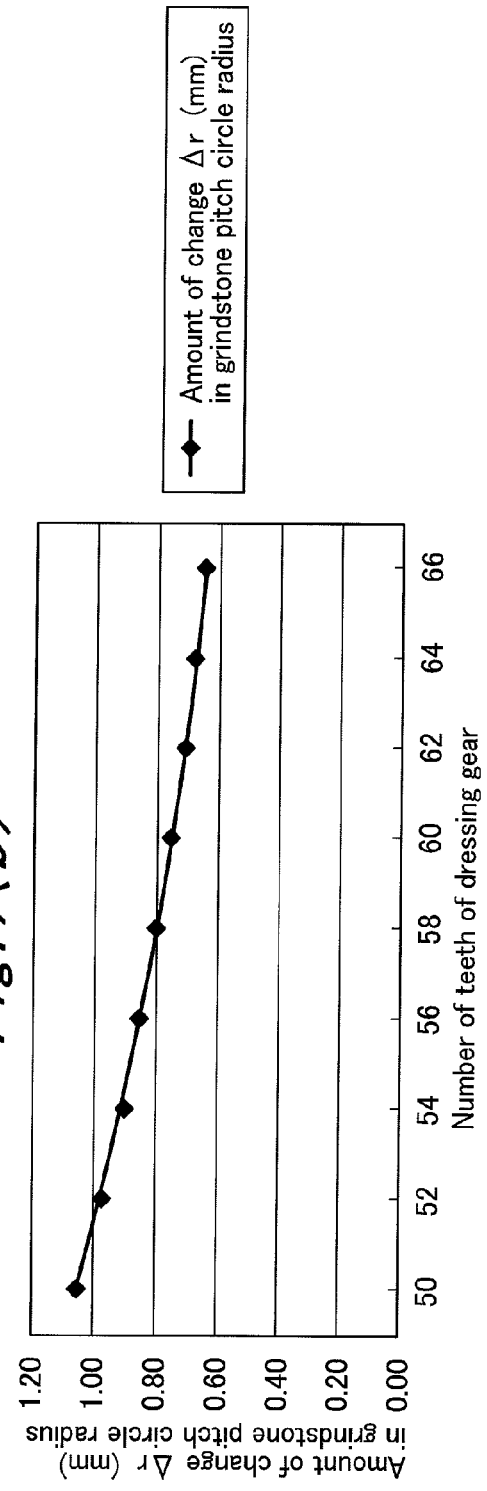
[FIGS. 7(a) and 7(b)] show the results of analysis of a simulation (1), FIG. 7(a) being a table showing, for each number of the teeth of the dressing gear, the tooth bottom diameter (mm) of the dressing gear, the tooth top diameter (mm) of the dressing gear, the grindstone helix angle (deg) at the center in the axial direction, the axis angle (deg), the grindstone pitch circle diameter (mm) at the center in the axial direction, the grindstone pitch circle diameter (mm) at the end in the axial direction, and the amount of change Δr (mm) in the grindstone pitch circle radius, and FIG. 7(b) being a graph showing the relation between the amount of change Δr (mm) in the grindstone pitch circle radius and the number of teeth of the dressing gear.

In the simulation (1), dressing gear specifications, barrel-shaped worm-like grindstone specifications, and work (internal gear to be machined) specifications were set as in the following (D1), (T1) and (W1), respectively:

(D1) Dressing Gear Specifications
Module: 2
Pressure angle: 20°
Helix angle: 20°
Tooth width: 30 mm
(T1) Grindstone Specifications
Number of teeth: 23
Grindstone outer diameter (center): 75.6 mm
Grindstone width: 30 mm
Grindstone helix angle (center): 50°
(W1) Work Specifications
Module: 2
Number of teeth: 60
Pressure angle: 20°
Helix angle: 20°
Tooth bottom diameter: 131.7 mm
Work pitch circle diameter: 127.7 mm
Tooth top diameter: 123.7 mm
Tooth width: 30 mm When the barrel-shaped worm-like grindstone was dressed by the dressing gear having a smaller number of teeth than the number of teeth of the internal gear to be machined (columns 1 to 5 in FIG. 7(a)), it was found that the amount of change Δr in the grindstone pitch circle radius became larger than when the barrel-shaped worm-like grindstone was dressed by the dressing gear having the same number of teeth as the number of teeth of the internal gear to be machined (column 6 in FIG. 7(a)). That is, it was found that the grindstone pitch circle diameter at the end in the axial direction of the barrel-shaped worm-like grindstone changed; concretely, it was found that as the number of teeth of the dressing gear was decreased in comparison with the number of teeth of the internal gear to be machined, the amount of change Δr in the grindstone pitch circle radius increased. It follows, therefore, that the dressing of the barrel-shaped worm-like grindstone by the dressing gear having a smaller number of teeth than the number of teeth of the internal gear to be machined makes it possible to render the diameter at the end of the barrel-shaped worm-like grindstone smaller than the dressing of the barrel-shaped worm-like grindstone by the dressing gear having the same number of teeth as the number of the teeth of the internal gear to be machined.

In accordance with the above-described procedure, the radius of curvature of the barrel-shaped worm-like grindstone became smaller at the end in the axial direction than at the center in the axial direction. As a result, when the heat-treated internal gear to be machined is finished using the barrel-shaped worm-like grindstone, the cutting edge at the end in the axial direction of the barrel-shaped worm-like grindstone 12 can be prevented from cutting, to a greater degree than required, into the tooth space of the internal gear to be machined. Consequently, reductions in the machining load and unequal wear can be achieved. Furthermore, the entire barrel-shaped worm-like grindstone 12 can uniformly contact the tooth flanks of the internal gear to be machined, and can thereby carry out gear machining with high accuracy. It turned out that such a barrel-shaped worm-like grindstone could be easily produced.

Secondly, the simulation (2) will be described using FIGS. 8(a), 8(b).

Figures 8A, 8B:
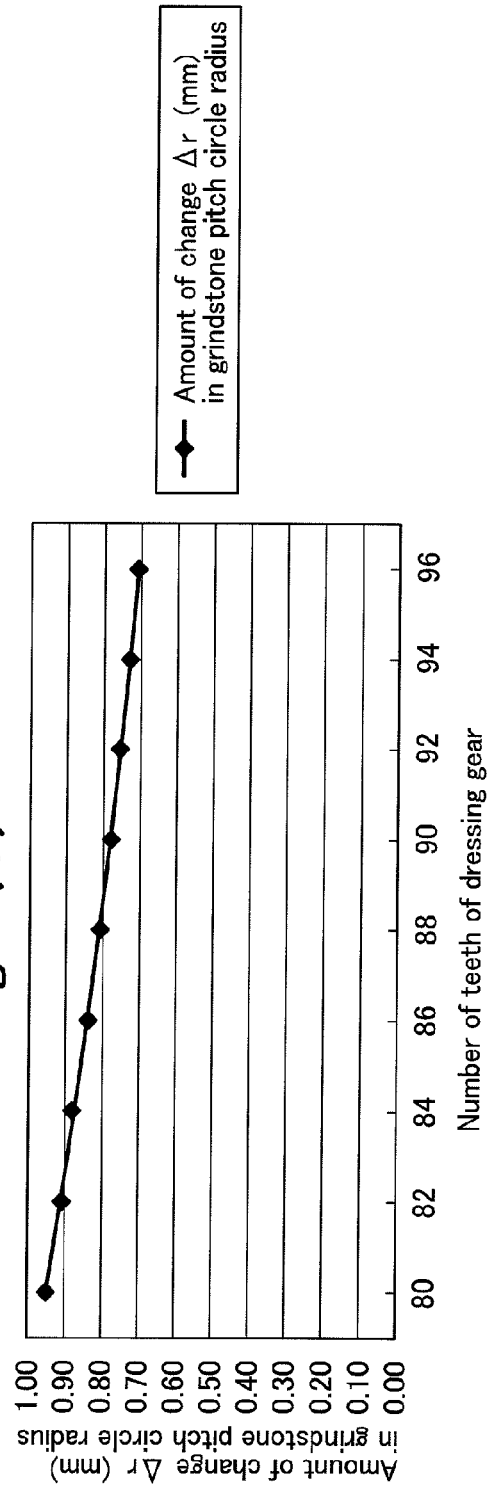
[FIGS. 8(a) and 8(b)] show the results of analysis of a simulation (2), FIG. 8(a) being a table showing, for each number of the teeth of the dressing gear, the tooth bottom diameter (mm) of the dressing gear, the tooth top diameter (mm) of the dressing gear, the grindstone helix angle (deg) at the center in the axial direction, the axis angle (deg), the grindstone pitch circle diameter (mm) at the center in the axial direction, the grindstone pitch circle diameter (mm) at the end in the axial direction, and the amount of change Δr (mm) in the grindstone pitch circle radius, and FIG. 8(b) being a graph showing the relation between the amount of change Δr (mm) in the grindstone pitch circle radius and the number of teeth of the dressing gear.
Figure 9:
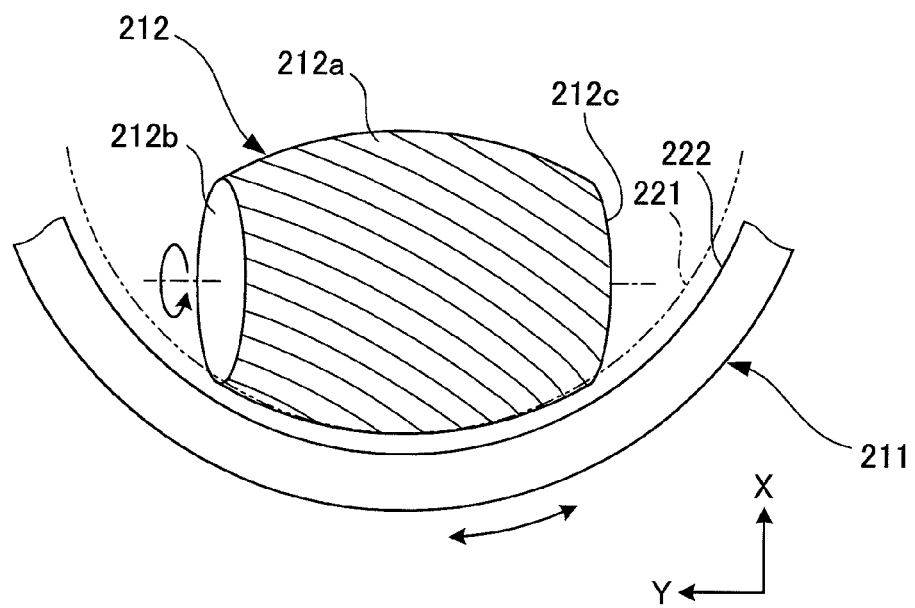
[FIG. 9] is a view showing the manner of grinding an internal gear to be machined, with the use of a conventional grindstone.

In the simulation (2), dressing gear specifications, barrel-shaped worm-like grindstone specifications, and work (internal gear to be machined) specifications were set as in the following (D2), (T2) and (W2), respectively:

(D2) Dressing Gear Specifications
Module: 1.2
Pressure angle: 20°
Helix angle: 20°
Tooth width: 30 mm
(T2) Grindstone Specifications
Number of teeth: 31
Grindstone outer diameter (center): 60.3 mm
Grindstone width: 30 mm
Grindstone helix angle (center): 50°
(W2) Work Specifications
Module: 1.2
Number of teeth: 90
Pressure angle: 20°
Helix angle: 20°
Tooth bottom diameter: 117.3 mm
Work pitch circle diameter: 114.9 mm
Tooth top diameter: 112.5 mm
Tooth width: 30 mm As shown in FIG. 8(a), even with the grinding of the internal gear to be machined, which had specifications different from those in the simulation (1), the following findings similar to those in the simulation (1) were obtained: When the barrel-shaped worm-like grindstone was dressed/trued using the dressing gear having a different number of teeth from the number of the teeth of the internal gear to be machined, the grindstone pitch circle diameter at the end in the axial direction of the barrel-shaped worm-like grindstone changed; concretely, as the number of teeth of the dressing gear was decreased in comparison with the number of the teeth of the internal gear to be machined, the pitch circle diameter at the end in the axial direction of the barrel-shaped worm-like grindstone became smaller than the pitch circle diameter at the center in the axial direction.

In accordance with the above-described procedure, the radius of curvature of the barrel-shaped worm-like grindstone became smaller at the end in the axial direction than at the center in the axial direction. As a result, when the heat-treated internal gear to be machined is finished using the barrel-shaped worm-like grindstone, the cutting edge at the end in the axial direction of the barrel-shaped worm-like grindstone can be prevented from cutting, to a greater degree than required, into the tooth space of the internal gear to be machined. Consequently, reductions in the machining load and unequal wear can be achieved. Furthermore, the entire barrel-shaped worm-like grindstone 12 can uniformly contact the tooth flanks of the internal gear to be machined, and can thereby carry out gear machining with high accuracy. It turned out that such a barrel-shaped worm-like grindstone could be easily produced.

[Second Embodiment]

A method of making a barrel-shaped worm-like tool according to a second embodiment will be described by reference to FIGS. 4 to 6. In the present embodiment, an explanation will be offered for a case where the method is applied to a dressing apparatus equipped with a disk dresser (dressing tool).

Figure 4:
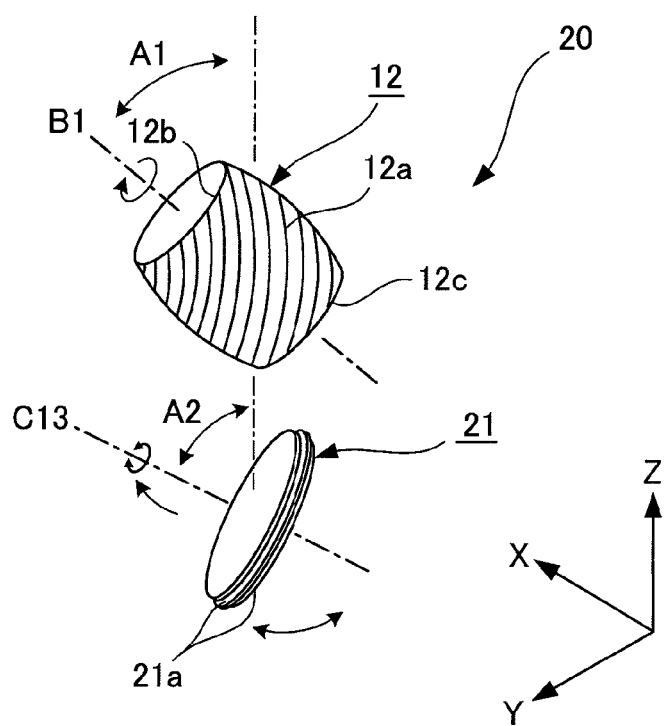
[FIG. 4] is a view showing a support structure for a grindstone and a disk dresser in a dressing apparatus in which a method of making a barrel-shaped worm-like tool is applied as another embodiment of the present invention.

An internal gear grinding machine (not shown) is provided with a dressing apparatus 20 equipped with a disk dresser 21, as shown in FIG. 4. That is, the dressing apparatus 20 is mounted on a mounting jig provided on a rotating table on a bed of the internal gear grinding machine. Thus, the disk dresser 21 is supported to be rotatable about a dresser rotation axis (tool rotation axis) C13 which forms a predetermined mounting angle (for example, the helix angle of a work) A2 with a vertical direction. The disk dresser 21 is also supported to be turnable about a vertical dresser swivel axis (work rotation axis) C1. The disk dresser 21 is disposed at a predetermined distance from the dresser swivel axis C1, and is swiveled about the axis C1.

The disk dresser 21 is of a shape having, as its contours, the sectional shape of the tooth of the internal gear W to be machined (i.e., the line of contact with the grindstone). A cutting edge surface 21a is formed at the edge along the circumferential surface of the disk dresser 21. In this configuration, the disk dresser 21 can dress the barrel-shaped worm-like grindstone (barrel-shaped worm-like tool) 12.

Next, a dressing operation by the dressing apparatus 20 will be described using FIGS. 5 and 6.

Figure 5:
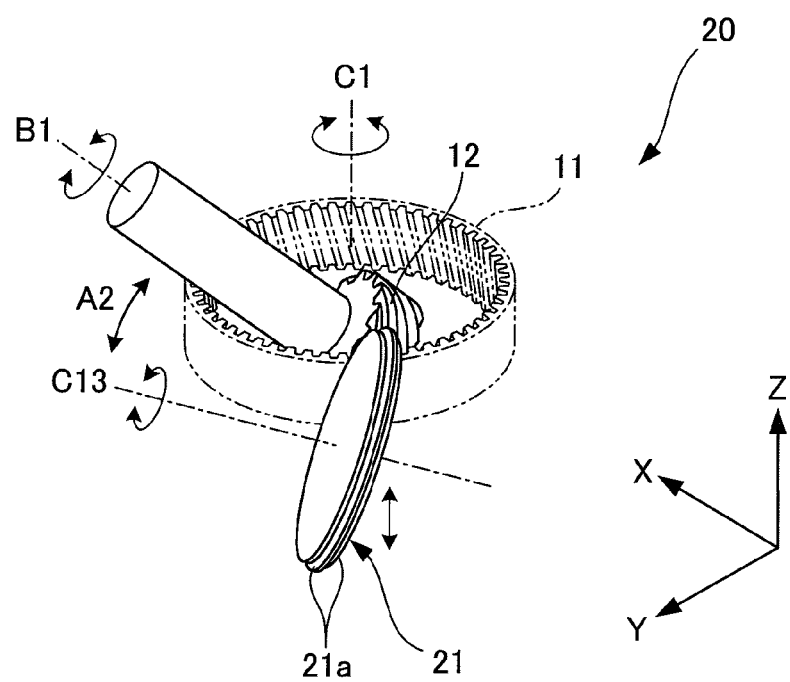
[FIG. 5] is a view showing the manner of dressing the barrel-shaped worm-like grindstone by the disk dresser.
Figure 6:
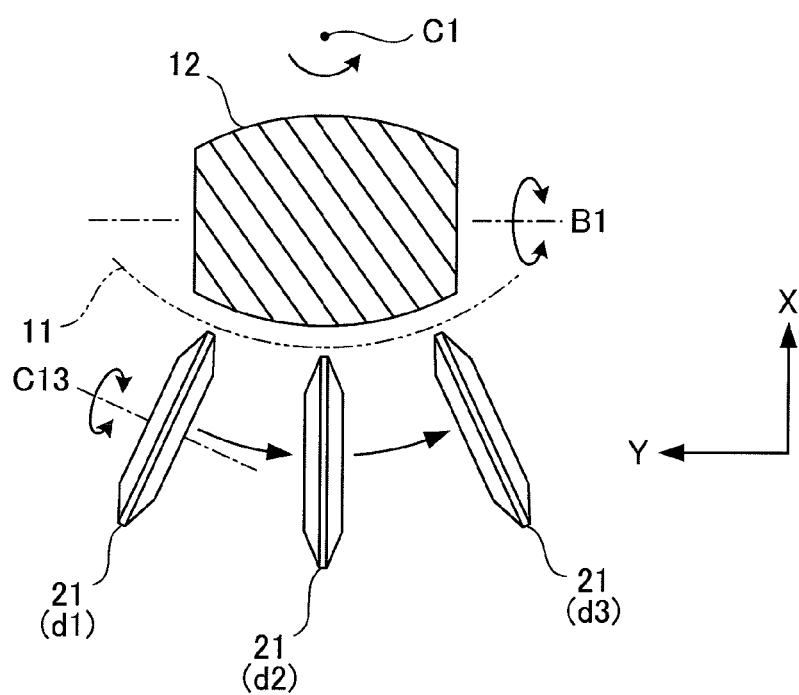
[FIG. 6] is a schematic view showing the dressing operation of the disk dresser.

As shown in FIGS. 5 and 6, after the barrel-shaped worm-like grindstone 12 and the disk dresser 21 are engaged with each other, the barrel-shaped worm-like grindstone 12 is rotated about a grindstone rotation axis B1, and the disk dresser 21 is rotated about the dresser rotation axis C13. Along with these rotations, the disk dresser 21 is swiveled about the dresser swivel axis C1, with the barrel-shaped worm-like grindstone 12 being moved along the X axis and the Y axis so that the disk dresser 21 travels along the gullets or tip-to-tip spaces of the barrel-shaped worm-like grindstone 12. During this process, the disk dresser 21 is moved from a position d1 to a position d2 where the disk dresser 21 meshes with the center of the barrel-shaped worm-like grindstone 21, and then from the position d2 a position d3 where the disk dresser 21 meshes with the other end of the barrel-shaped worm-like grindstone 21, thereby performing dressing/truing.

The operation of the disk dresser 21 and the operation of the barrel-shaped worm-like grindstone 12 described above are controlled based on operating data. The operating data are computed by a dressing operation computing unit based on the shape of the grindstone in which the number of teeth is assumed to be smaller by a predetermined amount than the number of teeth in the inputted specification data on the internal gear to be machined, and the helix angle, etc. other than the number of teeth are assumed to be the same as in the specification data on the internal gear to be machined. As a result, the barrel-shaped worm-like grindstone 12 is formed in the shape of a barrel whose diametrical dimension becomes further gradually smaller than a dimension suitable for the shape of the internal gear to be machined after finishing, from the middle (center) in the axial direction toward the opposite ends 12b, 12c in the axial direction along the direction of the grindstone width (the length in the axial direction of the grindstone).

Thus, when the heat-treated internal gear to be machined is finished using the barrel-shaped worm-like grindstone 12, the cutting edge at the end in the axial direction of the barrel-shaped worm-like grindstone 12 can be prevented from cutting, to a greater degree than required, into the tooth space of the internal gear to be machined. Consequently, reductions in the machining load and unequal wear can be achieved. Furthermore, the entire barrel-shaped worm-like grindstone 12 can uniformly contact the tooth flanks of the internal gear to be machined, and can thereby carry out gear machining with high accuracy.

The lower limit value of the number of teeth of the internal gear to be machined, which is assumed when performing dressing/truing by the disk dresser 21, is set, with grinding properties (grinding time) being considered from the machining allowance of the internal gear to be machined, or the contact width (length) between the barrel-shaped worm-like grindstone 12 and the internal gear to be machined when the internal gear to be machined is ground by the barrel-shaped worm-like grindstone 12.

INDUSTRIAL APPLICABILITY

According to the present invention, a barrel-shaped worm-like grindstone, which can achieve reductions in machining load and unequal wear and perform gear machining with high accuracy, can be easily prepared. Thus, the present invention can be used advantageously in the machine tool industry or the like.

Explanations of Letters or Numerals
11 Dressing gear
12 Barrel-shaped worm-like grindstone
20 Dressing apparatus
21 Disk dresser
A1 Axis intersection angle
A2 Dresser mounting angle
B1 Grindstone rotation axis
C1 Work rotation axis (dressing gear rotation axis)
C13 Dresser rotation axis

The invention claimed is:
1. A method of dressing a barrel-shaped worm tool that uses a dressing tool to dress the barrel-shaped worm tool, the barrel-shaped worm tool is used for gear-machining an internal gear to be machined by the barrel-shaped worm tool and has a diameter gradually increasing from ends in an axial direction to a center in the axial direction of the barrel-shaped worm tool, the dressing tool is an internally toothed dressing gear having a smaller number of teeth than the number of the teeth of the internal gear to be machined, the method comprising:
providing the internally toothed dressing gear having the smaller number of teeth than the number of teeth in specification data for the internal gear to be machined;
engaging the provided internally toothed dressing gear and the barrel-shaped worm tool with each other at the same axis intersection angle as during gear-machining to be performed by the barrel-shaped worm tool; and
dressing the barrel-shaped worm tool using the internally toothed dressing gear.

* * * * *